United States Patent [19]
Ohmori et al.

[11] 3,982,256
[45] Sept. 21, 1976

[54] ROTARY SHUTTER BLADE MECHANISM FOR CAMERAS

[75] Inventors: Sachio Ohmori; Shuji Kimura, both of Yokohama, Japan

[73] Assignee: Nippon Kogaku K.K., Tokyo, Japan

[22] Filed: June 5, 1975

[21] Appl. No.: 583,899

[30] Foreign Application Priority Data
June 18, 1974  Japan................................ 49-68684

[52] U.S. Cl................................ 354/253; 352/214; 354/254; 354/256; 354/260; 354/261
[51] Int. Cl.²......................................... G03B 9/16
[58] Field of Search.................... 352/208, 214, 219; 354/261–262, 250–254, 256, 260, 65

[56] References Cited
UNITED STATES PATENTS

| | | | |
|---|---|---|---|
| 2,788,704 | 4/1957 | Habig................................ | 354/250 |
| 2,925,763 | 2/1960 | Hill-Venning...................... | 354/265 |
| 3,099,196 | 7/1963 | Neubert............................. | 354/260 |
| 3,693,523 | 9/1972 | Tenkumo et al................... | 354/250 |

Primary Examiner—L. T. Hix
Assistant Examiner—James LaBarre
Attorney, Agent, or Firm—Fitzpatrick, Cella, Harper & Scinto

[57] ABSTRACT

Rotary shutter blade mechanism includes at least a shutter blade which rotates always in one direction. The driving energy of the shutter blade is recovered by a driving spring in the course of deceleration of the blade. An auxiliary actuating means is adapted to supply one directional rotative force to the driving shaft of the blade. A rotary cam means is secured to the driving shaft and has at its periphery at least one pair of accelerating portions and decelerating portions. A reciprocating lever means is pivotally mounted in the body portion of the mechanism. The lever means has a portion engageable with the accelerating and decelerating portions. A main actuating means urges the lever means so that the engaging portions may contact the rotary cam means. The driving shaft is locked when the respective foremost ends of the accelerating portions are engaged with the engaging portion of the lever means. The accelerating portions are designed to receive pivotal motion of the lever means while pressed at said engaging portion by urging force of the main actuating means for rotating said cam means in said one direction when the lock on said driving shaft is released, while said decelerating portions are so designed as to pivot said lever means with rotation of said cam means through said engaging portion in the direction opposed to the urging force of said main actuating means and to let said lever means return to its original position for stopping said driving shaft, and said cam means is so formed that the foremost end of said accelerating portions will be positioned adjacent to the rearmost end of said decelerating portions.

4 Claims, 3 Drawing Figures

ROTARY SHUTTER BLADE MECHANISM FOR CAMERAS

BACKGROUND OF THE INVENTION

1. Field of the Invention

This invention relates to a rotary shutter blade driving mechanism for cameras.

2. Description of the Prior Art

There is already proposed (in U.S. Pat. No. 3,672,282) a shutter blade driving unit of the type in which the energy used for operation of the shutter blades is absorbed and accumulated in the unit in the course of deceleration of the blades and such accumulated energy is used for the next operation of the shutter blades. (This type of shutter is hereinafter referred to as an energy absorption type shutter). This shutter blade driving unit, however, has many cam surfaces and locking means, so that it is an extremely complicated mechanism. Further, according to this driving unit, a substantial portion of energy is wasted due to friction loss caused during movement of the blades, so that the deficient energy must be supplied from the outside in the final stroke of the next shutter charge, and hence a large force is suddenly required at the termination of the shutter charge.

SUMMARY OF THE INVENTION

The object of the present invention is to provide a shutter driving mechanism which is extremely simple in construction and in which the driving energy of the rotary shutter blade, which rotates always in one direction alone, is absorbed during the time when said blade stays stationary, and such absorbed energy is utilized for the next operation of the shutter blade.

DESCRIPTION OF THE PREFERRED EMBODIMENTS

Now the present invention will be described in detail by way of an embodiment thereof with reference to the accompanying drawings.

Figure 1:
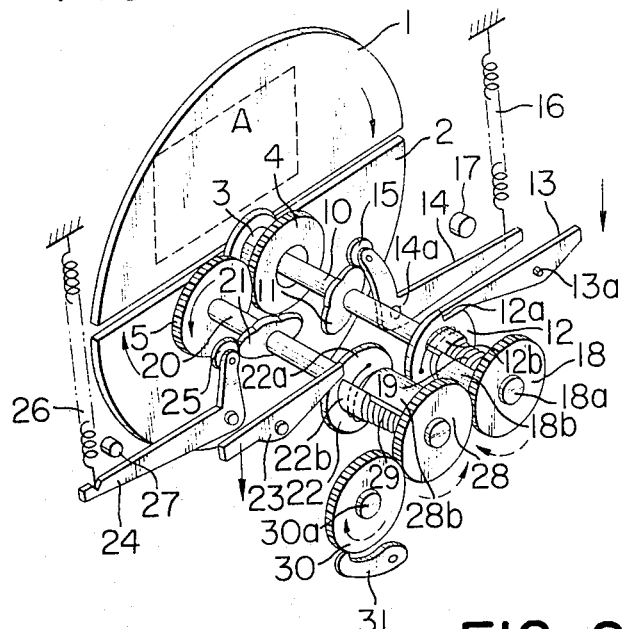
FIG. 1 is a perspective view of an embodiment of the present invention.

Referring to FIG. 1 which shows a preferred embodiment of the present invention, it will be seen that a semi-circular first shutter blade 1 is so positioned as to close the film aperture A opposite thereto. This first shutter blade 1 is secured to a first driving shaft 10 so that the former turns in accordance with clockwise rotation of the latter to expose the film. A second shutter blade 2, which is also semi-circular in shape, is secured to an interlocking shaft 3. Mounted on said interlocking shaft 3 is a gear 4 which is meshed with a gear 5 mounted on a second driving shaft 20 and having the same number of teeth as said gear 4, so that said second shutter blade 2 can also turn clockwise in accordance with counterclockwise rotation of said second driving shaft 20 to close the film aperture A. The first driving shaft 10 extends through the inside of the interlocking shaft 3, and both shafts are supported by respective supporting means (not shown) so that they can rotate independently of each other.

A first driving cam 11 and a locking disc 12 are secured to a middle part and to an end, respectively, of the first driving shaft 10. Said locking disc 12 is provided with two notches 12a (only one is shown in the drawing) spaced 180° from each other near its periphery and one projection 12b at its side portion. An end of a release lever 13 pivotally supported by a shaft 13a fits in one of said notches 12a in said disc 12 to inhibit rotation of said disc and hence rotation of the first driving shaft 10. The release lever 13 is normally urged to rotate counterclockwise by a spring (not shown), and when the other end thereof is pressed in the direction of the arrow by the operation of a shutter release member (not shown), it pivots to move away from the notch 12a. A roller 15 adapted to cooperate with said driving cam 11 is pivotally mounted at an end of a lever 14 pivoted by a shaft 14a, the other end of said lever 14 being connected to a main driving spring 16 so that said lever 14 is normally urged to rotate counterclockwise about the shaft 14a. A stopper 17 is provided to limit counterclockwise rotation of said lever 14. A gear 18 pivotally supported on a shaft 18a has on its side a projection 18b which is engageable with the corresponding projection 12b formed on said disc 12. One end of a coil spring 19 serving as an auxiliary shutter driving means is secured to said gear 18 and the other end is secured to the disc 12 so that said spring is energized by clockwise rotation of the gear 18 to give a clockwise rotative force to the first driving shaft 10.

The second driving shaft 20, second driving cam 21, second locking disc 22, protuberance 22b, openings 22a, second release lever 23, second lever 24, second roller 25, second main driving spring 26, second stopper 27, second gear 28 and second auxiliary coil spring 29 are all substantially similar in construction and function as their respective first counterparts described above, and hence the details of these members are not mentioned here to avoid redundancy.

A gear 30 pivotally supported by a shaft 30a and driven by a means (not shown) is meshed with the gear 18 through the gear 28, so that when the gear 30 is rotated clockwise by an external force, said gear 28 turns counterclockwise while said gear 18 turns clockwise 180° respectively to compress the auxiliary springs 29 and 19, respectively. A ratchet pawl 31 is adapted to prevent reverse rotation of the gear 30 and hence the gears 18 and 28.

Figure 2:
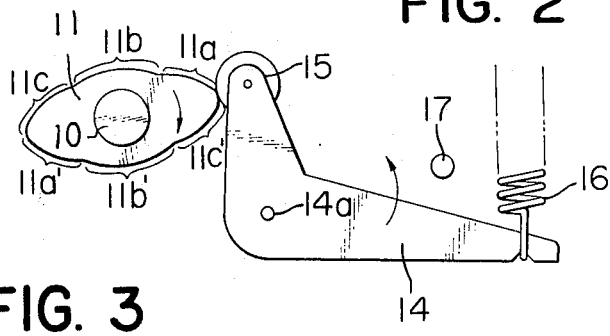
FIGS. 2 and 3 are front views illustrating the driving cam operation.
Figure 3:
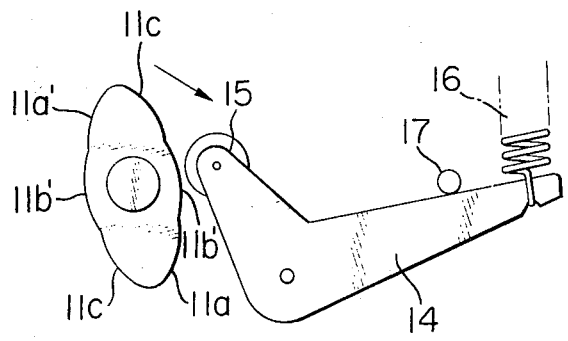

Now the positional relation of driving cam 11 and lever 14 will be described with reference to FIGS. 2 and 3.

Driving cam 11 is provided at its periphery with accelerating portions 11a, 11a', non-contacting portions 11b, 11b', and decelerating portions 11c, 11c'. The accelerating portions 11a, 11a' are positioned symmetrically with the decelerating portions 11c, 11c'. In FIG. 2, when the lever 14 is rotated counterclockwise by the action of the main spring 16, the roller 15 presses the accelerating portion 11a to let the cam 11 turn clockwise. During this time, the accelerating portion maintains contact with the roller 15, but the non-contacting portion 11b stays away from the roller 15 as turning motion of lever 14 is checked by the stopper 17 as shown in FIG. 3.

The decelerating portion 11c contacts with roller 15 just like the accelerating portion 11a. The same behavior takes place with another accelerating portion 11a', another non-contacting portion 11b' and another decelerating portion 11c'.

Now the operation of the mechanism will be described.

In the condition shown in FIG. 1, the operator operates a shutter release member (not shown) so that an end of the first release lever 13 is pushed down to break engagement between the other end of said release lever and the notch 12a in the locking disc 12, thereby unlocking the first shutter blade 1. This causes the first locking disc 12 to rotate clockwise under the urging force of the first auxiliary spring 19. At the same time, the first lever 14 is forced to pivot counterclockwise by the first main driving spring 16, and this motion is transmitted through the first roller 15 to the first driving cam 11 to depress its accelerating portion 11a to rotate said cam 11 clockwise, as shown in FIG. 2. Thus, the first shutter blade 1 is rotated clockwise through the first driving shaft 10 with rotation of the locking disc 12 and driving cam 11, that is, by the force of auxiliary spring 19 and main spring 16 to start exposure of the film. When contact of the roller 15 with the accelerating portion 11a terminates, the lever 14 hits against the stopper 17 to check its rotation, so that the roller 15 is maintained out of contact with the non-contacting portion 11b as shown in FIG. 3, and hence the first driving shaft 10 is rotated by its own inertia and the force of the auxiliary spring 19. Then, when the decelerating portion 11c is contacted with the roller 15, the lever 14 is caused to pivot clockwise against the force of main spring 16, and the kinetic energy of the shutter blade 1, driving shaft 10 and other associated members is converted into potential energy of the main spring 16 to decelerate said shutter blade 1. When the driving shaft 10 turns just 180° from the position of FIG. 2, an end of the release lever 13 is engaged with another notch located 180° apart from the notch 12a in the disc 12 to thereby stop movement of the shutter blade 1, driving shaft 10 and other associated members.

On the other hand, when the second release lever 23 is pressed, the second shutter blade 2 is rotated clockwise by the force of the second main spring 26 and second auxiliary spring 29 in the same way as their said counterparts (first members), and its kinetic energy is retrieved by the spring (26), allowing the second shutter blade 2 to turn 180° and to stop at the position where it closes the film aperture A, thereby completing the film exposure.

As apparent from the foregoing explanation, the exposure time is determined by the period from start of operation of the first release lever 13 till start of operation of the second release lever 23, so that it is possible to obtain a desired exposure time by properly timing the operations of these two release levers 13 and 23 by a shutter speed adjuster (not shown).

The function of auxiliary springs 19 and 29 is to supply the loss of kinetic energy caused by friction or other factors during movement of the shutter blades 1, 2, driving shaft 10 and other members. To put it more minutely, operation of the shutter blades 1, 2 relies mostly on the urging force of the main springs 16, 26, and the loss of kinetic energy caused by friction and other factors during movement of the shutter blades is supplied by the urging force of the auxiliary springs 19, 29. That is, the portion of energy released from the main springs 16, 26 is entirely recovered when the shutter blades are decelerated. Thus, all the function required of the auxiliary springs is to merely supply the energy loss resulting from friction and other causes, so that such auxiliary springs may be far lower in strength than the main springs. For making the next shot, first the film is transferred by operating the winding lever or driving motor and the gear 30 is turned clockwise to rotate the gears 18 and 28 in the direction of arrows to thereby energize the auxiliary springs 19 and 29. Thereafter, the second release lever 23 is pressed first this time to move the second shutter blade 2 and then the first release lever 13 is pressed to move the first shutter blade 1 to thereby effect film exposure.

In this embodiment of the present invention, the order of operation of the release levers 13, 23 is reversed when a second exposure is made, but the shutter release mechanism for accomplishing such reverse operation constitutes no part of the present invention and hence it is not described here.

Now the relation between the projections 12b, 22b on the locking discs 12, 22 and the corresponding projections 18b, 28b on the gears 18, 28 will be described.

These paired projections 12b, 18b and 22b, 28b are positioned in contact with or closely adjacent to each other when the shutter is being charged as shown in FIG. 1, so that they exert no influence on any part of the shutter mechanism when the latter is operating normally as described above. However, if an unexpected external force is exerted on shutter blade 1 and/or other members during movement of said shutter blade from the position of FIG. 1 and said shutter blade 1 is stopped before it turns 180° from the position of FIG. 1 (in this case the projection 12b is also stopped without turning full 180°), the projection 18b on the gear 18 is engaged with the projection 12b in the course of clockwise rotation of said gear 18 at the time of the next shutter charge to let said projection 12b rotate to the position of 180° from the first position. This forces the shutter blade 1 and driving shaft 10 to also rotate to the position 180° from its first position whereby the main spring 16 is perfectly energized. Thus, the shutter is charged for sure whenever the gear 30 is rotated.

Although there has been described hereabove a rotary shutter mechanism provided with two shutter blades, the number of such shutter blades is of no account in the principle of the present invention. For instance, a rotary shutter according to the present invention may be provided with only one shutter blade. In this case, the driving means for the second shutter blade 2 and the second driving shaft 20 are unnecessary and the first locking disc 12 is provided with only one notch. Also, the driving cam 11 is so configured that it makes one rotation with release of the lock by the release lever 13.

As apparent from the foregoing description, it is possible according to the present invention to recover the shutter driving energy for the next shutter operation with a very simple mechanism, so that shutter charge can be accomplished with supply of only a small amount of energy. Further, when rotation of the shutter blades should be stopped, as the main springs will have already recovered their energy entirely, it is only required to actuate the auxiliary springs alone for effecting shutter charge, so that such shutter charging operation can be accomplished smoothly from its start to end. Moreover, as kinetic energy of the operated shutter blades is gradually absorbed by the decelerating cam portions, shutter impact is lessened to reduce the shutter operating sound.

We claim:

1. A rotary shutter blade driving mechanism in which the driving energy of the rotary shutter blade is recovered by a driving spring of said shutter blade in the course of deceleration of said blade, comprising:

driving shaft means for driving the shutter blade in one direction only;

auxiliary actuating means adapted to give one-directional rotative force to said driving shaft means;

rotary cam means secured to said driving shaft means and having at its periphery at least one pair of accelerating portions and at least one pair of decelerating portions;

reciprocating lever means having an engaging portion engageable with said accelerating and decelerating portions and pivotally mounted relative to said rotary cam means;

main actuating means adapted to give to said lever means a rotative force of the direction in which said engaging portions come to contact said rotary cam means; and means for locking said driving shaft means when respective foremost ends of said accelerating portions are engaged with said engaging portion of said lever means, wherein said accelerating portions are so designed as to receive rotating motion of said lever means caused by the urging force of said main actuating means while pressing said engaging portion against said accelerating portions for turning said cam means in said one direction when said means for locking said driving shaft means is released, while said decelerating portions are so designed as to turn said lever means, upon rotation of said cam means, through said engaging portion in the direction opposed to the urging force of said main actuating means and to let said lever means return to its original position for stopping said driving shaft means, and said cam means is so formed that the foremost end of each accelerating portion will be positioned adjacent to the rearmost end of each decelerating portion.

2. A rotary shutter blade driving mechanism according to claim 1, wherein said rotary shutter blade comprises substantially semi-circular first and second sectors adapted alternately to cover a film aperture of which the one covering the film aperture at a given time provides a front curtain and the other positioned 180° apart from said first sector provides a rear curtain, with the positional relation of said front and rear curtains being changed upon every exposure, said driving shaft means including first and second driving shafts arranged to drive said respective first and second sectors in one direction only, said auxiliary actuating means comprising first and second auxiliary springs adapted to actuate said first and second driving shafts, respectively, said cam means comprising first and second cams secured to said first and second driving shafts, respectively, said first and second cams each having a pair of accelerating portions and a pair of decelerating portions at the periphery thereof, said lever means comprising first and second levers engaged with said first and second cams, respectively, said main actuating means comprising first and second main driving springs adapted to actuate said first and second levers, respectively, and said locking means comprising first and second lock members adapted to lock said first and second driving shafts, respectively, and wherein the period from release of lock of one of said first and second locking means till release of lock of the other locking means is the exposure time.

3. A rotary shutter blade driving mechanism according to claim 1, wherein said cam means has portions not contacted by the engaging portions of said lever means, said non-contacted portions being positioned respectively between the rearmost ends of said accelerating portions and the foremost ends of said decelerating portions, whereby said driving shaft means rotates at a constant speed during the time when said non-contacted portions pass said engaging portion.

4. A rotary shutter blade driving mechanism according to claim 2, wherein said first and second cams have portions not contacted by the engaging portions of said first and second levers, said non-contacted portions being positioned respectively between the rearmost ends of said accelerating portions and the foremost ends of said decelerating portions, whereby said first and second driving shafts rotate respectively at a constant speed during the time when said non-contacted portions of said first and second cams pass the respective corresponding engaging portions of the first and second levers.

* * * * *